(12) United States Patent
Keeney et al.

(10) Patent No.: US 9,452,644 B2
(45) Date of Patent: Sep. 27, 2016

(54) TIRE INFLATION SYSTEM WITH A PASSAGE FOR ROUTING PRESSURIZED GAS

(71) Applicant: ArvinMeritor Technology, LLC, Troy, MI (US)

(72) Inventors: Christopher Keeney, Troy, MI (US); James Keane, West Bloomfield, MI (US); Michael Andrew Power, Troy, MI (US); Dale Kwasniewski, Galesburg, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 366 days.

(21) Appl. No.: 14/029,856

(22) Filed: Sep. 18, 2013

(65) Prior Publication Data

US 2015/0075688 A1 Mar. 19, 2015

(51) Int. Cl.
*B60C 23/00* (2006.01)

(52) U.S. Cl.
CPC .................. *B60C 23/003* (2013.01)

(58) Field of Classification Search
CPC .................. B60C 23/001; B60C 23/003
USPC .................. 152/415, 416, 417
See application file for complete search history.

(56) References Cited

U.S. PATENT DOCUMENTS

| | | | | |
|---|---|---|---|---|
| 4,418,737 A | * | 12/1983 | Goodell | B60C 23/00 137/224 |
| 4,431,043 A | * | 2/1984 | Goodell | B60C 23/001 137/224 |
| 4,440,451 A | * | 4/1984 | Goodell | B60C 23/001 301/105.1 |
| 4,470,506 A | * | 9/1984 | Goodell | B60C 23/003 152/416 |
| 4,582,107 A | * | 4/1986 | Scully | B60C 23/007 152/415 |
| 5,174,839 A | * | 12/1992 | Schultz | B60C 23/003 152/415 |
| 5,253,688 A | * | 10/1993 | Tigges | B60C 23/003 152/417 |
| 6,994,136 B2 | | 2/2006 | Stanczak | |
| 7,690,412 B1 | | 4/2010 | Jenkinson et al. | |
| 7,931,061 B2 | | 4/2011 | Gonska et al. | |
| 8,616,254 B2 | | 12/2013 | Kelley et al. | |
| 2002/0112802 A1 | * | 8/2002 | D'Amico | B60C 23/003 152/415 |
| 2009/0211682 A1 | * | 8/2009 | Sobotzik | B60C 23/003 152/415 |
| 2012/0186714 A1 | | 7/2012 | Richardson | |
| 2012/0234447 A1 | | 9/2012 | Narloch et al. | |
| 2013/0228258 A1 | * | 9/2013 | Knapke | B60B 35/00 152/415 |

OTHER PUBLICATIONS

Meritor an ArvinMeritor brand, Meritor Tire Inflation System (MTIS) by PSI(TM), including Mentor ThermALERT (TM), PB-9999, Revised May 2007.

* cited by examiner

*Primary Examiner* — Kip T Kotter

(74) *Attorney, Agent, or Firm* — Brooks Kushman P.C.

(57) ABSTRACT

A tire inflation system having a spindle that is configured to support a wheel bearing. A passage for routing pressurized gas may be provided with the spindle or with a sleeve that may be disposed on the spindle.

20 Claims, 3 Drawing Sheets

TIRE INFLATION SYSTEM WITH A PASSAGE FOR ROUTING PRESSURIZED GAS

TECHNICAL FIELD

This patent application relates to a tire inflation system having a passage for routing pressurized gas.

BACKGROUND

A tire inflation system with an integral wheel seal is disclosed in U.S. Pat. No. 7,931,061.

SUMMARY

In at least one embodiment, a tire inflation system is provided. The tire inflation system may include a spindle and a plug. The spindle may be configured to support a wheel bearing and may have an end surface, an internal surface, an external surface, and a passage for routing pressurized gas through the spindle. The internal surface may extend from the end surface and may at least partially define a hole for receiving an axle shaft. The external surface may be disposed opposite the internal surface. The passage may include a first portion, a second portion, and a third portion. The first portion may extend from the external surface toward the internal surface. The second portion may extend from the external surface toward the internal surface. The third portion may connect the first portion to the second portion. The plug may be disposed in the third portion.

In at least one embodiment, a tire inflation system is provided. The tire inflation system may include a spindle and a sleeve. The spindle may be configured to support a wheel bearing and may have an end surface and an internal surface. The internal surface may extend from the end surface and may at least partially define a hole for receiving an axle shaft. The sleeve may have a sleeve opening that receives the spindle. The sleeve may at least partially define a passage for routing a pressurized gas. The passage may include a first portion, a second portion that may be spaced apart from the first portion, and a third portion that may extend from the first portion to the second portion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
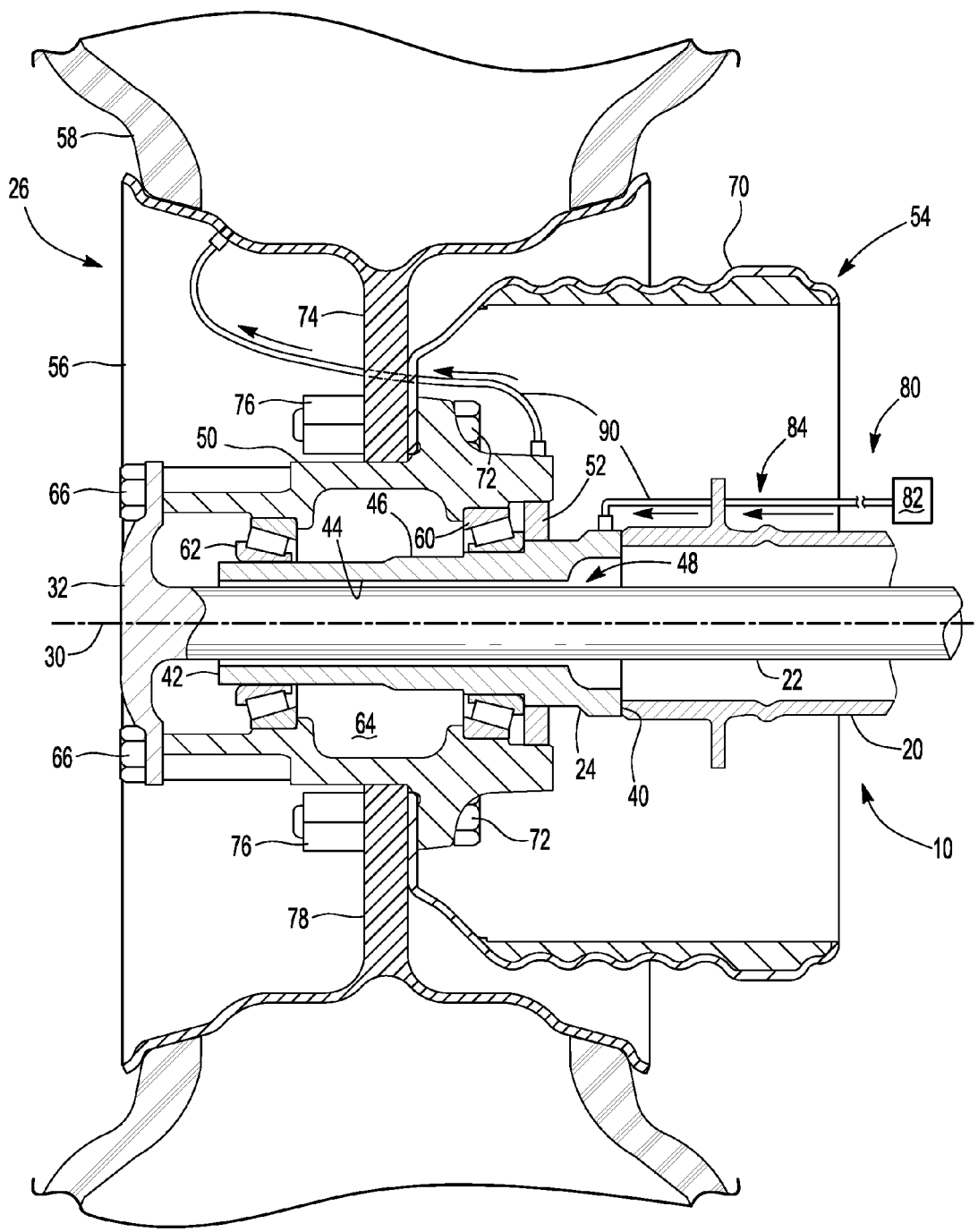
FIG. 1 is a section view of an exemplary wheel end assembly having a tire inflation system.

Referring to FIG. 1, a portion of an exemplary axle assembly 10 is shown. The axle assembly 10 may be provided with a motor vehicle like a truck, bus, farm equipment, military transport or weaponry vehicle, or cargo loading equipment for land, air, or marine vessels.

The axle assembly 10 may be configured as a drive axle that may receive torque from a power source, such as an internal combustion engine or electric motor. Alternatively, the axle assembly 10 may be configured as a non-drive axle in one or more embodiments. The axle assembly 10 may or may not be steerable. In a drive axle configuration, the axle assembly 10 may include an axle housing 20, an axle shaft 22, a spindle 24, and a wheel end assembly 26.

The axle housing 20 may receive various components of the axle assembly 10. In addition, the axle housing 20 may facilitate mounting of the axle assembly 10 to the vehicle. The axle housing 20 may define a cavity that may receive at least a portion of the axle shaft 22.

The axle shaft 22 may provide torque to the wheel end assembly 26 to propel the vehicle. For instance, the axle shaft 22 may be connected at a first end to a vehicle drivetrain component, like a differential or input shaft, and may be coupled to the wheel end assembly 26 at a second end. In at least one embodiment, the axle shaft 22 may extend along and may rotate about an axis 30. Alternatively, the axle shaft 22 may be configured for use with an independent suspension system and may have multiple shaft segments and/or joints, such as constant-velocity joints, that may facilitate relative movement between the first end and the wheel end assembly 26. The axle shaft 22 may include an axle flange 32 disposed at a distal end. The axle flange 32 may facilitate mounting of the wheel end assembly 26 to the axle shaft 22. In a non-drive axle configuration, the axle shaft 22 may be omitted.

The spindle 24 may be provided with or may be fixedly positioned with respect to the axle assembly 10. The spindle 24 may generally extend along but may not rotate about the axis 30. In a drive axle configuration, the spindle 24 may include a first end surface 40, a second end surface 42, an internal surface 44, an external surface 46, and a hole 48. In a non-drive axle configuration, the internal surface 44 and the hole 48 may be omitted. Moreover, in a steerable non-drive axle configuration, the spindle 24 may be provided with or may be fixedly positioned with respect to a steering knuckle rather than the axle housing 20. The first end surface 40 may be disposed proximate or may engage the axle housing 20. The second end surface 42 may be disposed opposite the first end surface 40 and may be located near the axle flange 32. The internal surface 44 may extend between the first end surface 40 and the second end surface 42 and may at least partially define the hole 48 through which the axle shaft 22 may extend. As such, the spindle 24 may be spaced apart from the axle shaft 22 to permit the axle shaft 22 to rotate about the axis 30. The external surface 46 may be disposed opposite the internal surface 44. The external surface 46 of the spindle 24 may support one or more wheel bearings that may rotatably support the wheel end assembly 26 as will be discussed in more detail below.

The wheel end assembly 26 may be rotatably coupled to the axle shaft 22. The wheel end assembly 26 may include a hub 50, a wheel end seal assembly 52, a brake subsystem 54, a wheel 56, and a tire 58.

The hub 50 may be spaced apart from and rotatably disposed on the spindle 24. For instance, one or more wheel bearings may be mounted on spindle 24 and may rotatably support the hub 50. In FIG. 1, a first wheel bearing 60 and a second wheel bearing 62 are provided in a cavity 64 that is located between the spindle 24 and the hub 50. The first wheel bearing 60 may be disposed inboard or further from the second end surface 42 than the second wheel bearing 62. As such, the hub 50 may be configured to rotate about the axis 30. In a drive axle configuration, the axle flange 32 may be coupled to the hub 50 with one or more fasteners 66. As such, the hub 50 may rotate with the axle shaft 22. In a non-drive axle configuration, the hub 50 may not be coupled to an axle 22 or axle flange 32.

The wheel end seal assembly 52 may be disposed between the spindle 24 and the hub 50. The wheel end seal assembly 52 may inhibit contaminants from entering the cavity 64 and may help retain lubricant in the cavity 64. In at least one embodiment, the wheel end seal assembly 52 may be fixedly disposed with respect to the hub 50 and may rotate about the axis 30 and with respect to the spindle 24.

The brake subsystem 54 may be adapted to slow or inhibit rotation of at least one associated wheel 56. For example, the brake subsystem 54 may be configured as a friction brake, such as a drum brake or a disc brake. In FIG. 1, a portion of the brake subsystem 54 is shown with a drum brake configuration. In a drum brake configuration, a brake drum 70 may be fixedly disposed on the hub 50 with one or more fasteners 72, such as wheel lug studs. The brake drum 70 may extend continuously around brake shoe assemblies (not shown) that may be configured to engage the brake drum 70 to slow rotation of an associated wheel 56.

The wheel 56 may be fixedly disposed on the hub 50. For example, the wheel 56 may be mounted on the hub 50 via the fasteners 72. More specifically, the wheel 56 may have a wheel mounting flange 74 that may have a set of holes that may each receive a fastener 72. A lug nut 76 may be threaded onto each fastener to secure the wheel 56 to the fasteners 72 and the hub 50. The lug nut 76 may engage or may be disposed proximate an outboard side 78 of the wheel mounting flange 74 that faces way from the brake drum 70 or toward the axle flange 32. The wheel 56 may be configured to support the tire 58. The tire 58 may be a pneumatic tire that may be inflated with a pressurized gas or pressurized gas mixture.

A tire inflation system 80 may be associated with the wheel end assembly 26. The tire inflation system 80 may be disposed on the vehicle and may be configured to provide a pressurized gas or pressurized gas mixture to one or more tires 58. For clarity, the term "pressurized gas" may refer to either a pressurized gas or a pressurized gas mixture in this application. The tire inflation system 80 may include a control system that may monitor and control the inflation of one or more tires 58, a pressurized gas source 82, and a gas supply subsystem 84.

The pressurized gas source 82 may be configured to supply or store a volume of a pressurized gas or pressurized gas mixture, like air or nitrogen. For example, the pressurized gas source 82 may be a tank and/or a pump like a compressor. The pressurized gas source 82 may be disposed on the vehicle and may provide a pressurized gas or pressurized gas mixture at a pressure that is greater than or equal to a desired inflation pressure of a tire 58. As such, the pressurized gas source 82 may inflate a tire or maintain a desired tire pressure.

The gas supply subsystem 84 may fluidly connect the pressurized gas source 82 to the tire 58. The gas supply subsystem 84 may include one or more conduits 90, 90', 90", 90''', such as a hose, tubing, pipe, or combinations thereof. In addition, one or more valves may be associated with or provided with a conduit 90, 90', 90", 90''' to enable or disable the flow of the pressurized gas from the pressurized gas source 82 to one or more tires 58. The routing of the conduits 90, 90', 90", 90''' between the pressurized gas source 82 and a tire 58 is exemplary and is not meant to be limiting as other conduit routing paths may be provided. The flow of pressurized gas is represented by the arrows located adjacent to the conduit 90, 90', 90", 90''' in FIGS. 1-5.

Figure 2:
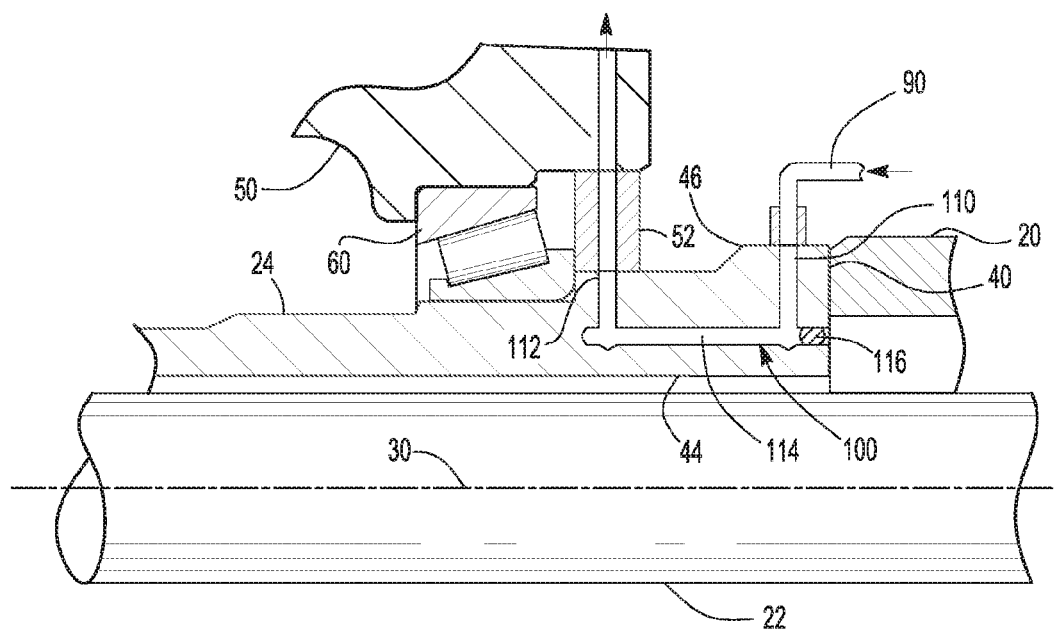
FIGS. 2-5 are section views illustrating passages for routing pressurized gas that may be provided with the tire inflation system.
Figure 3:
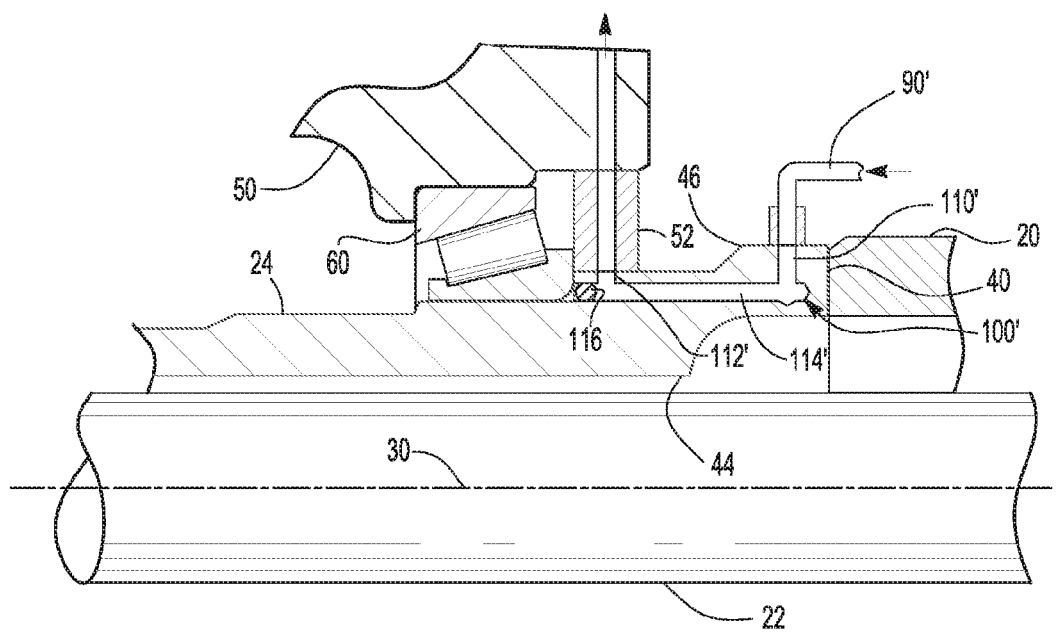
Figure 4:
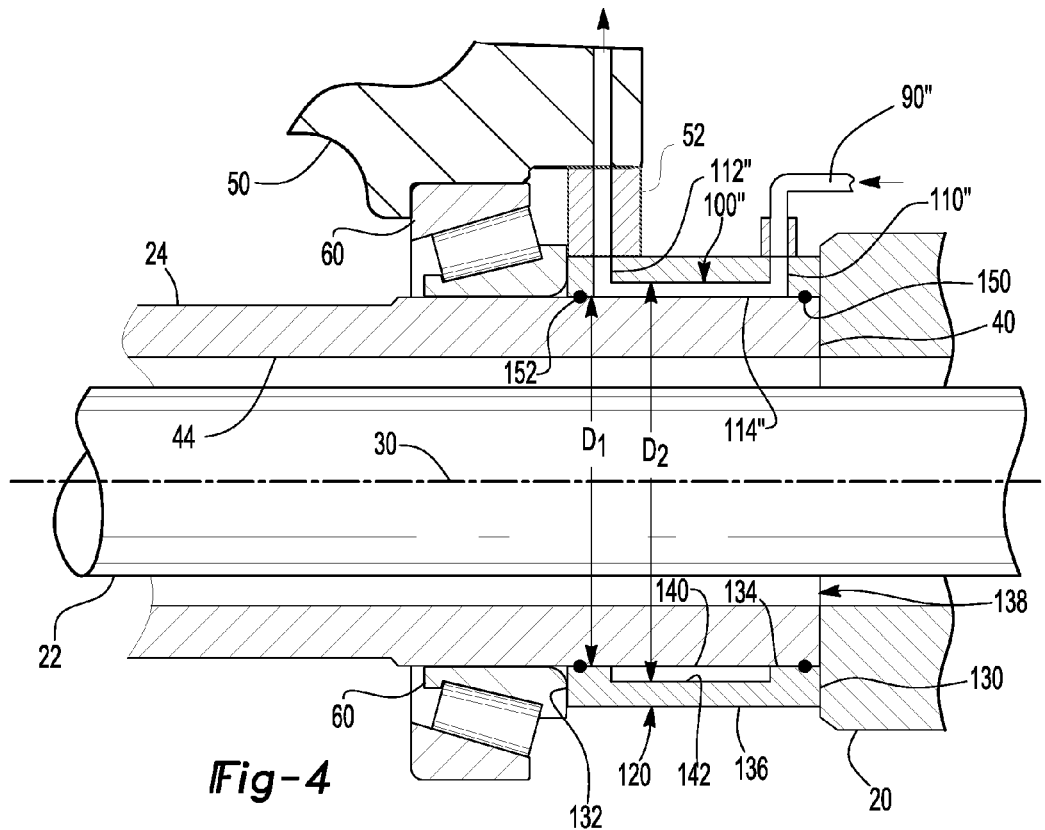
Figure 5:
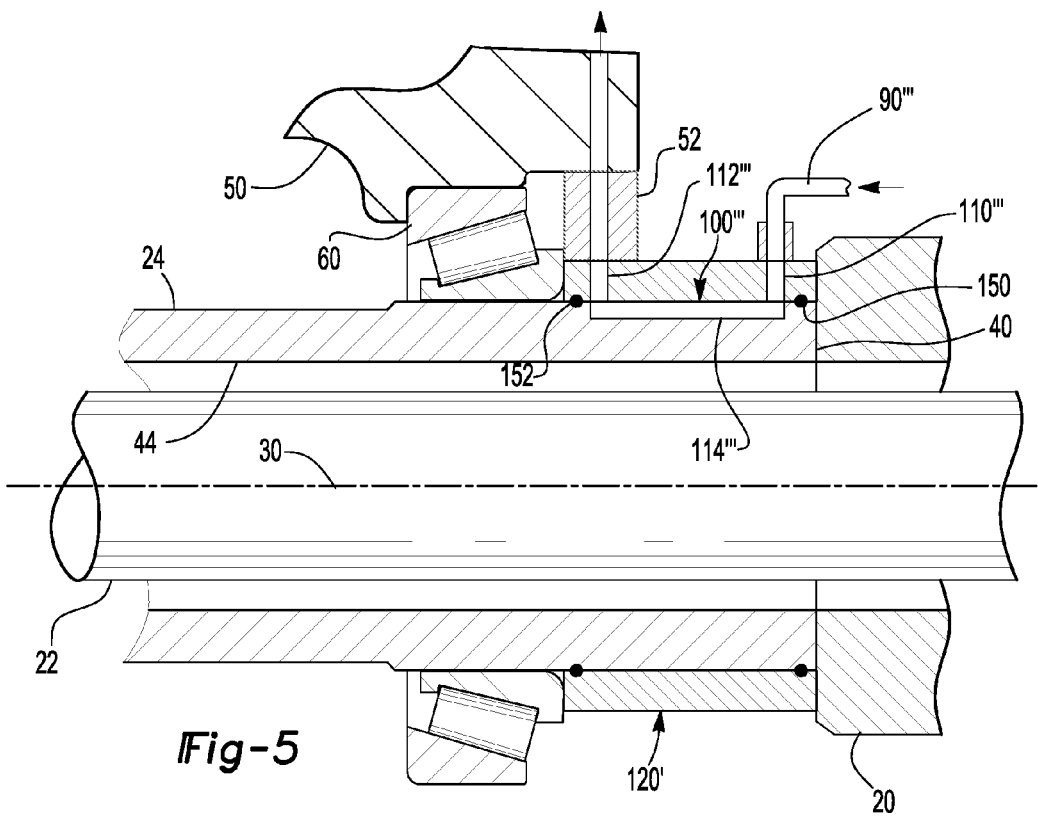

Referring to FIGS. 2 and 3, the gas supply subsystem 84 may include a passage 100, 100' that may extend through the spindle 24. The passage 100, 100' may include a first portion 110, 110' a second portion 112, 112' and a third portion 114, 114'. Corresponding reference numbers are employed in FIGS. 4 and 5. FIG. 4 shows a passage 100", first portion 110", second portion 112", and third portion 114'. FIG. 5 shows a passage 100''', first portion 110''', second portion 112''', and third portion 114".

The first portion 110, 110', 110", 110''' may be an inlet that receives pressurized gas from the gas supply subsystem 84. The first portion 110, 110', 110", 110''' may be disposed between the first end surface 40 of the spindle 24 and the first wheel bearing 60. The first portion 110, 110' may extend from the external surface 46 toward the internal surface 44. In at least one embodiment, the first portion 110, 110', 110", 110''' may extend toward the axis 30 and may be linear.

The second portion 112, 120', 120", 120''' may be an outlet that delivers pressurized gas to another component, such as the seal assembly 52. The second portion 112, 120', 120", 120''' may also be disposed between the first end surface 40 of the spindle 24 and the first wheel bearing 60. The second portion 112, 120', 120", 120''' may be spaced apart from the first portion 110. The second portion 112, 112' may extend from the external surface 46 toward the internal surface 44. In at least one embodiment, the second portion 112, 120', 120", 120''' may extend toward the axis 30 and may be linear. The second portion 112, 112' may have a shorter length than the first portion 110, 110'.

The third portion 114, 114', 114", 114''' connect the first portion 110, 110', 110", 110'' to the second portion 112, 112', 112", 112'''. In the embodiment shown in FIG. 2, the third portion 114 extends from the first end surface 40 toward the first wheel bearing 60 and may terminate proximate the second portion 112. The third portion 114, 114', 114", 114''' may be substantially linear and may extend parallel to the axis 30 in one or more embodiments. A plug 116 may be disposed in the third portion 114 between the first end surface 40 and the first portion 110 to inhibit leakage of a pressurized gas. The plug 116 may have any suitable configuration. For example, the plug 116 may be configured as a ball that may be press fit into the third portion 114, 114'.

In the embodiment shown in FIG. 3, the third portion 114, 114' extends from the first wheel bearing 60 to the first portion 110, 110'. The plug 116 may be disposed in the third portion 114, 114' between the first wheel bearing 60 and the second portion 112, 112' to inhibit leakage of pressurized gas.

Referring to FIGS. 4 and 5, additional examples of passages that may be provided with the gas supply subsystem 84 are shown. In FIGS. 4 and 5, the spindle 24 has a sleeve 120, 120' that may at least partially define the passage 100", 100'''.

The sleeve 120, 120' may have a generally cylindrical configuration and may be extend around the axis 30. As such, the sleeve 120, 120' and spindle 24 may be concentrically disposed about the axis 30. In at least one embodiment, may include a first sleeve end 130, a second sleeve end 132, an interior surface 134, and an exterior surface 136.

The first sleeve end 130 may be disposed proximate the first end surface 40 of the spindle 24 and may engage the axle housing 20. The first sleeve end 130 may extend from the interior surface 134 to the exterior surface 136.

The second sleeve end 132 may be disposed opposite the first sleeve end 130 and may be disposed proximate or may engage the first wheel bearing 60. The second sleeve end 132 may also extend from the interior surface 134 to the exterior surface 136.

The interior surface 134 may extend between the first and second sleeve ends 130, 132 and may at least partially define a sleeve opening 138 through which the spindle 24 may extend. The interior surface may at least partially define an inside circumference of the sleeve 120, 120' and may be disposed proximate or may engage the external surface 46 of the spindle 24.

The exterior surface 136 may also extend between the first sleeve end 130 and the second sleeve end 132. The exterior surface 136 may be disposed opposite the interior surface 134 and may at least partially define an outside circumference of the sleeve 120, 120'.

The passage may include a first portion 110", 110"', a second portion 112", 112"', and a third portion 114", 114"'.

The first portion 110' may be an inlet that receives pressurized gas from the gas supply subsystem 84. The first portion 110' may be configured as a hole in the sleeve 120 that may extend from the exterior surface 136 to the interior surface 134. In at least one embodiment, the first portion 110' may extend toward the axis 30 and may be linear.

The first portion 110", 110"' may be an inlet that receives pressurized gas from the gas supply subsystem 84. The first portion 110", 110"' may be configured as a hole in the sleeve 120, 120' that may extend from the exterior surface 136 to the interior surface 134. In at least one embodiment, the first portion 110", 110"' may extend toward the axis 30 and may be linear.

The second portion 112", 112"' may be an outlet that delivers pressurized gas to another component, such as the seal assembly 52. The second portion 112", 112"' may be spaced apart from the first portion 110", 110"'. In addition, the second portion 112", 112"' may be configured as a hole in the sleeve 120, 120' that may extend from the exterior surface 136 toward the interior surface 134. In at least one embodiment, the second portion 112", 112"' may extend toward the axis 30 and may be linear.

The third portion 114", 114"' may extend from the first portion 110", 110"' to the second portion 112", 112"'. The third portion 114", 114' may be at least partially defined by the spindle 24. In the embodiments shown in FIGS. 4 and 5, the spindle 24 cooperates with the sleeve 120, 120' to define the third portion 114", 114"'.

In FIG. 4, the third portion 114", 114"' is configured as a groove 140 that may be recessed into the sleeve 120. The groove 140 may have a bottom surface 142 that may extend from the first portion 110', 110"' to the second portion 112', 112". The bottom surface 142 may be disposed further from the axis 30 than the interior surface 134 of the sleeve 120. For example, the diameter of the sleeve 120 proximate the interior surface 134, designated $D_1$, may be less than the diameter proximate the bottom surface 142, designated $D_2$ in FIG. 4. The groove 140 may extend continuously around the axis 30 in a ringlike manner. Alternatively, the groove 140 may not extend completely around the axis 30 and may extend generally parallel to the axis 30 from the first portion 110", 110"' to the second portion 112", 112"'.

In FIG. 5, the third portion 114"' is recessed into the spindle 24 instead of being configured as a recess or groove in the sleeve 120'. As such, the interior surface 134 of the sleeve 120' may be generally cylindrical and may at least partially define the third portion 114'.

It is also contemplated that the third portion 114", 114"' may recessed into both the spindle 24 and the sleeve 120, 120' in one or more embodiments.

One or more sleeve seals may be disposed between the sleeve 120 and the spindle 24 to inhibit leakage of pressurized gas. In FIGS. 4 and 5, a first seal 150 and a second seal 152 are provided. The first seal 150 may be disposed between the first sleeve end 130 and the first portion 110", 110"'. The second seal 152 may be disposed between the second sleeve end 132 and the second portion 112", 112"'. The first and second seals 150, 152 may have any suitable configuration. For example, the first and second seals 150, 152 may be configured as o-rings.

The embodiments discussed above may allow a spindle to be provided with a standardized external profile between the first wheel bearing and the second end while also equipping the spindle with a passage for supplying pressurized gas with a tire inflation system. By localizing the passage between the inboard end of the spindle and the first wheel bearing a passage may be provided with a short length to reduce associated manufacturing costs as compared to longer rifle drilled passages. In addition, such passages may be provided with a spindle and/or sleeve to accommodate the potential future addition of tire inflation system functionality to a vehicle without having to install a new spindle or replace the axle assembly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tire inflation system comprising:
   a spindle that is configured to support a wheel bearing, the spindle including:
      an end surface; and
      an internal surface that extends from the end surface and that at least partially defines a hole for receiving an axle shaft; and
   a sleeve that has an exterior surface, an interior surface disposed opposite the exterior surface, and a sleeve opening that receives the spindle, wherein the sleeve at least partially defines a passage for routing a pressurized gas, the passage including a first portion, a second portion spaced apart from the first portion, and a third portion that extends from the first portion to the second portion, wherein the first portion and the second portion are configured as holes that extend from the exterior surface to the interior surface.

2. The system of claim 1 wherein the third portion is at least partially defined by the spindle.

3. The system of claim 1 wherein the sleeve has a cylindrical configuration and wherein the exterior surface at least partially defines an outside circumference of the sleeve and the interior surface at least partially defines an inside circumference of the sleeve.

4. The system of claim 1 wherein the interior surface engages an external surface of the spindle that is disposed opposite the internal surface.

5. The system of claim 1 wherein the sleeve has a first sleeve end that extends from the exterior surface to the interior surface and a second sleeve end disposed opposite the first sleeve end that extends from the exterior surface to the interior surface, wherein the first sleeve end is disposed proximate the end surface of the spindle.

6. The system of claim 5 wherein the second sleeve end engages the wheel bearing.

7. The system of claim 5 further comprising a first seal disposed between the spindle and the interior surface, wherein the first seal is disposed between the first sleeve end and the first portion.

8. The system of claim 5 further comprising a second seal disposed between the spindle and the interior surface, wherein the second seal is disposed between the second sleeve end and the second portion.

9. The system of claim 8 wherein the sleeve and spindle are concentrically disposed about an axis and wherein the third portion is configured as a groove that is provided in the sleeve, wherein the groove has a bottom surface that extends from the first portion to the second portion and that is disposed further from the axis than the interior surface of the sleeve that engages the spindle.

10. The system of claim 9 wherein the groove extends continuously around the axis.

11. A tire inflation system comprising:
a spindle that supports a wheel bearing that rotatably supports a hub, the spindle including:
an end surface; and
an internal surface that extends from the end surface and that at least partially defines a hole for receiving an axle shaft; and
a sleeve that has a sleeve opening that receives the spindle, wherein the sleeve at least partially defines a passage for routing a pressurized gas, wherein the passage includes a first portion, a second portion spaced apart from the first portion, and a third portion that extends from the first portion to the second portion, wherein the sleeve engages the spindle and is spaced apart from the hub.

12. The system of claim 11 wherein the sleeve includes an exterior surface and an interior surface disposed opposite the exterior surface, wherein the first portion and the second portion are configured as holes that extend from the exterior surface to the interior surface.

13. The system of claim 11 wherein the sleeve includes an exterior surface and an interior surface disposed opposite the exterior surface, wherein the first portion is a hole that extends from the exterior surface to the interior surface.

14. The system of claim 11 wherein the sleeve includes an exterior surface and an interior surface disposed opposite the exterior surface, wherein the second portion is a hole that extends from the exterior surface to the interior surface.

15. The system of claim 11 wherein the third portion is at least partially defined by the spindle.

16. A tire inflation system comprising:
a spindle that is configured to support a wheel bearing, the spindle including:
an end surface; and
an internal surface that extends from the end surface and that at least partially defines a hole for receiving an axle shaft; and
a sleeve that has a sleeve opening that receives the spindle, an exterior surface, and an interior surface disposed opposite the exterior surface, wherein the sleeve at least partially defines a passage for routing a pressurized gas, wherein the passage includes a first portion that receives pressurized gas from a conduit, a second portion that is spaced apart from the first portion, and a third portion that extends from the first portion to the second portion, wherein the first portion and the second portion are configured as holes that extend from the exterior surface to the interior surface, the third portion provides pressurized gas to the second portion, and the second portion provides pressurized gas to a seal assembly.

17. The system of claim 16 wherein the sleeve has a cylindrical configuration.

18. The system of claim 16 wherein the third portion is at least partially defined by the spindle.

19. The system of claim 16 wherein the sleeve has a first sleeve end disposed proximate the end surface of the spindle.

20. The system of claim 16 further comprising a hub that is rotatably disposed on the spindle, wherein the sleeve engages the spindle and is spaced apart from the hub.

* * * * *